April 7, 1964 L. D. HARMON 3,128,459

BINARY GROUP COUNTER

Filed Dec. 18, 1959

INVENTOR
L. D. HARMON
BY A. E. Hirsch, Jr.
ATTORNEY 3,128,459
Patented Apr. 7, 1964

3,128,459

BINARY GROUP COUNTER

Leon D. Harmon, Warren Township, Somerset County, N.J., assignor to Bell Telephone Laboratories, Incorporated, New York, N.Y., a corporation of New York Filed Dec. 18, 1959, Ser. No. 860,398
12 Claims. (Cl. 340—347)

This invention relates to the automatic interpretation of coded information, and more particularly, to apparatus for determining conduction patterns in a plurality of register elements.

In the art of counting electrical impulses it has long been the practice to employ devices which translate an applied pulse into a coded signal, for example, into a binary system of representation, and which further accumulate or register the coded signals to provide an indication of the number of applied impulses. Typically, electrical devices, e.g., register elements, are employed that respond to an applied impulse and, in accordance with the amplitude of the pulse, assume one of two different stable states. It is often desirable to utilize register elements of this type in unique electrical configurations, which may include a plurality of elements connected in tandem, and to note at any desired instant the binary state of the individual elements in the configuration. Often this is done by shifting the contents of the register in serial order past an inspection station. Various other means of electrical commutation are well known in the art. While the usual modes of interrogating individual elements are satisfactory for some applications, they are quite inadequate in others where, for example, the number of groups of contiguous register elements, momentarily in the same state, must be counted.

For example, in the copending application Serial No. 795,649, filed February 26, 1959, now U.S. Patent No. 3,050,711, relating to the automatic recognition of scanned figures, e.g., geometric drawings or alpha-numeric characters, register elements are employed to represent the changes in illumination of photosensitive scanning elements. The usual techniques of interrogating individual register elements are unsatisfactory there since in order to classify the figure scanned, it is necessary to count the number of groups of contiguous register elements that are momentarily in the same state. The present invention provides an eminently suitable means for obtaining such a "group" count as distinguished from a count of the number of individual elements in the same state.

In the present invention apparatus is employed in which the photosensitive scanning elements of the above-mentioned application are each coupled to the input circuit of a different one of a plurality of binary devices that serve as the register elements. While initially all the devices are nonconducting, each is triggered to conduction whenever its associated photosensitive element is subjected to a suitable change in illumination. The instantaneous group conduction pattern of the binary devices is determined by utilizing a plurality of energy radiation sources, each one of which is connected between the output circuits, respectively, of a different pair of binary devices so as to couple the output circuits in tandem order. Since the output circuit potential of a conducting binary device differs from the output potential of a nonconducting device, a source radiates energy whenever the two devices between which it is connected are in different states. Since all the binary devices that form a contiguous group of devices in the same state have output circuit potentials that are equal in magnitude, those radiation sources connected between the binary devices comprising the group will not be energized. Consider, however, those two radiation sources which connect the binary devices at the ends of the group of like state to the next succeeding devices in the other conduction state. Since these two radiation sources are each connected between binary devices in different states, the sources will be energized. Accordingly, the total energy radiation gives an indication of the total number of groups of contiguous binary devices in the same state, regardless of how many devices comprise a group. The total radiation may be detected by any convenient means.

In another embodiment of this invention the counting circuit includes a network for providing "lockout," i.e., a circuit for preventing a nonconducting binary device from subsequently being triggered to conduction whenever the two "flanking" binary devices are conducting. (A binary device is "flanked" by the two binary devices to which it is coupled by the energy radiation sources.) This feature finds a specific application in the figure scanning apparatus referred to above, since two conducting binary devices flanking a nonconducting device represent certain characteristics of the scanned figure and it is necessary to preserve this conduction pattern in order to effect figure classification.

The invention may be more readily understood by reference to the following detailed description of embodiments of this invention, taken in conjunction with the appended drawings, in which.

Figure 1:
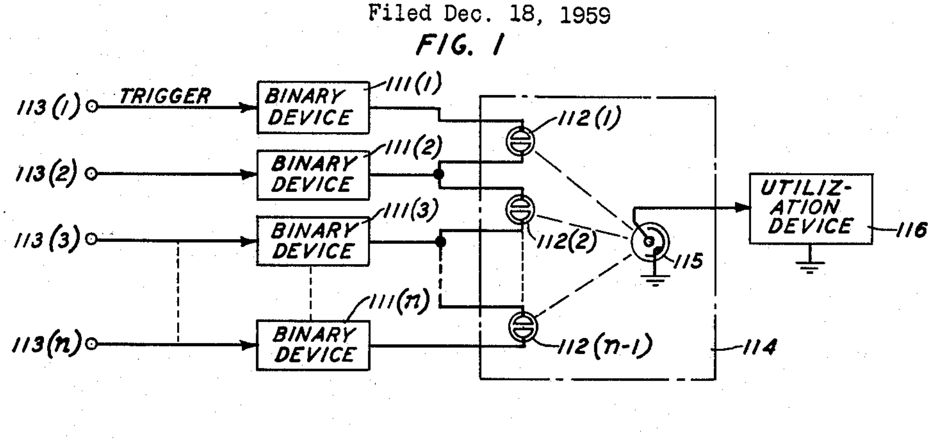
FIG. 1 is a schematic block diagram illustrating one form of the invention.

Referring to FIG. 1, any number of binary devices 111(1), 111(2), 111(3) . . . 111($n$) are electrically arranged in tandem by virtue of the radiation sources 112 which connect together the output circuits of adjacent ones of the binary devices. While the sources 112 may be devices that radiate any type of energy, it has been found convenient to utilize lamps as these sources, in which case light energy is radiated. The lamps 112 are connected so that lamp 112(1) couples together the outputs of binary devices 111(1) and 111(2); lamp 112(2) couples together the outputs of binary devices 111(2) and 111(3), and so on to lamp 112($n$—1) which couples together the outputs of binary devices 111($n$—1), not shown, and 111($n$). The binary devices may be connected in an electrical ring by connecting the outputs of the first binary device 111(1) and the $n$th device 111($n$) by a lamp 112($n$), not shown.

Each of the binary devices 111 has a control circuit, the input terminal to which is designated 113. Any sources of triggering signals capable of independently triggering the binary devices 111 from one stable state to another may be applied, respectively, to the input terminals 113. In conjunction with the geometric figure scanning apparatus referred to above, photosensitive scanning elements are advantageously employed as triggering voltage sources.

One of the lamps 112 is energized whenever the two binary devices between which it is connected are in different states, e.g., conducting and nonconducting, respectively, since the outputs are then at different potentials. Thus, a lamp 112 is not energized if the two corresponding devices are in the same states and, hence, at approximately the same output potentials. Accordingly, the total number of energized lamps 112 is equal to the number of "transitions" from a conducting binary device to an electrically adjacent nonconducting device. It may be seen that such transitions occur only at the ends of a group of contiguous devices in the same state, since adjacent devices within the group are, by definition, in the same state. Thus, a determination of the total lamp radiation will give an indication of the total number of groups of contiguous devices in the same state. Lamps 112 are preferably enclosed within the container 114, and the sum of their radiation is detected by a detector 115, which may conveniently be a photocell. The signal from the detector 115, the magnitude of which is proportional to the number of groups of contiguous devices in the same state, are used to control an appropriate utilization device 116.

If the devices are connected in an electrical ring, i.e., if the outputs of binary devices 111(1) and 111($n$) are connected by a lamp 112($n$), not shown, the number of energized lamps will be equal to twice the number of groups of contiguous conducting devices. The number of energized lamps is also equal to twice the number of groups of contiguous nonconducting devices. On the other hand, if the devices are not connected in an electrical ring, but are rather left in an electrical line or in open-end fashion, as depicted in FIG. 1, it will be seen that the output circuits of the first and the $n$th binary devices do not each have two lamps connected thereto, as do all the other devices. Therefore, the number of groups of contiguous devices in any one state is dependent upon the number of energized lamps and the states of the binary devices at the ends of the line. If $a$ equals the number of energized lamps, if $y$ equals the number of groups of contiguous conducting devices in a line of devices, and if $z$ equals the number of groups of contiguous nonconducting devices within the line, the following relationships exist:

$$y=\frac{a}{2} \text{ and } z=\frac{a+2}{2}$$

if the first and the $n$th binary devices are both nonconducting;

$$y=z=\frac{a+1}{2}$$

if the first and the $n$th devices are in different states;

$$y=\frac{a+2}{2} \text{ and } z=\frac{a}{2}$$

if the first and the $n$th devices are both conducting.

It should be noted that a single binary device in one state that is flanked by devices in another state constitutes by itself a "group" of devices.

It has been found advantageous to utilize neon lamps as the energy radiation sources 112, since the characteristic operation of such lamps is essentially binary. That is, a lamp is energized only upon the application of an input voltage equal to or greater than its ignition potential. Incandescent lamps, on the other hand, have a light output which is proportional to the voltage input, and thus, if used, might radiate undesired light energy if subjected to spurious small potential differences.

The container 114 may be conveniently any light-tight holder and preferably is one in the shape of a frustum of a cone. With such an arrangement, the neon lamps may be clustered in a circle and placed in the larger end of the frustum. Since the photocell 115, which suitably is positioned in the narrower end of the frustum, generally has a nonlinear operating characteristic for small values of impinging light, a small, constantly energized light source may be placed within the holder to bias the photocell into its linear operating range.

Figure 2:
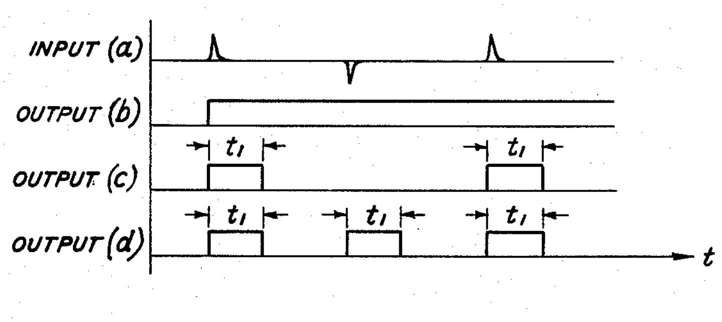
FIG. 2 is a set of curves illustrating the waveforms associated with one of the binary devices depicted in FIG. 1.

Although the binary devices 111 are chosen to remain in a state of conduction for the particular situation in which they are triggered by photosensitive scanning elements used to scan geometric figures, this is not, of course, at all necessary. In fact, the binary devices may have any type of operating characteristics. The important consideration is that the instantaneous states of conduction of the group form some sort of binary representation of given data. FIG. 2 gives a few examples, which are not intended to be exclusive, of possible waveforms of the output of a binary device for one given set of input pulses. Curve ($a$) shows a sequence of three pulses which may be applied to any one of the input terminals 113 of FIG. 1. Curves ($b$), ($c$) and ($d$), respectively, depict possible output waveforms of the associated binary device. In curve ($b$) the waveform represents the output of a binary device that is triggered to conduction by a positive input pulse and which remains in a state of conduction regardless of further input signals. Curve ($c$) depicts the output of a binary device that is triggered to conduction upon the application to its control circuit of positive pulses only, but whose state of conduction persists only for time $t_1$. Curve ($d$) shows the output of a binary device that is triggered to conduction upon the application to its control circuit of either positive or negative pulses, and whose state of conduction persists only for time $t_1$.

Figure 3:
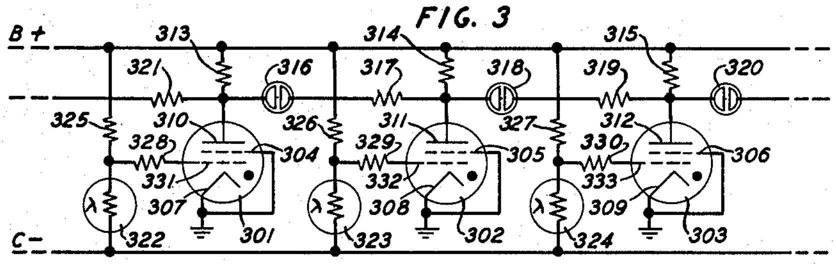
FIG. 3 is a schematic circuit diagram of an embodiment of this invention.

FIG. 3 is a schematic circuit diagram of an embodiment of this invention utilizing thyratrons as the binary elements, and neon lamps as the radiation sources. In order to simplify the illustration, only three stages are shown. However, all stages are similarly constructed, and any number of stages may be utilized in the manner shown in FIG. 1. Three thyratrons 301, 302 and 303, respectively, serve as the binary elements. The screen grids 304, 305 and 306 are connected to their associated cathodes 307, 308 and 309, respectively, which are in turn connected to a reference potential, e.g., ground. The plates 310, 311 and 312 are connected, respectively, through plate load resistors 313, 314 and 315, to a source of positive potential B+. The three thyratrons are electrically connected one to another by neon lamps and current-limiting resistors. Thus, the plates 310 and 311 of thyratrons 301 and 302 are coupled together by neon lamp 316 and current-limiting resistor 317. Likewise, lamp 318 and resistor 319 couple together plates 311 and 312 of thyratrons 302 and 303. The neon lamp 320 connected to plate 312 of thyratron 303, and the current-limiting resistor 321 connected to the plate 310 of thyratron 301 extend to adjacent stages, not shown.

Thyratrons 301, 302 and 303 are triggered to conduction through the action of photoresistors 322, 323 and 324, respectively, which, together with biasing resistors 325, 326 and 327, serve as variable voltage dividing elements. As previously suggested, the use of photoresistors as the triggering control elements is not essential. However, photoresistors have been found to be extremely useful, since they also serve as the figure scanning elements disclosed in the copending application referred to above. Each photoresistor and its associated biasing resistor are connected in series between a positive potential source B+ and a negative potential source C−. The junctions between the photoresistors and their associated biasing resistors are connected through resistors 328, 329 and 330, respectively, to the control grids 331, 332 and 333. Each point of connection is thus at some potential intermediate between the potentials B+ and C− according to the relative magnitudes of the associated photoresistor and biasing resistor. Resistors 328, 329 and 330 serve to limit the flow of grid current and to prevent the grid voltages from oscillating due to unwanted coupling between circuit elements.

Each of the photoresistors has a resistance characteristic such that its resistance varies in inverse proportion to the amount of light impinging thereon. The resistance of each of the associated biasing resistors is chosen so that it is of relatively high magnitude when compared with the resistance of an illuminated photoresistor, but of relatively low magnitude when compared with the resistance of a shadowed photoresistor. Thus, when light impinges upon any photoresistor the voltage difference between potential sources B+ and C− is distributed between that photoresistor and its associated biasing resistor so as to bias negatively the control grid of the associated thyratron. This action prevents the thyratron from being triggered to conduction. When any photoresistor is shadowed, however, as when the photoresistor is used as a scanning element and senses a line of a figure being scanned, its resistance is much greater than that of its associated biasing resistor. Thus, the control grid of the associated thyratron is biased positively, thereby triggering the thyratron to conduction.

Due to the voltage drop across the plate load resistor of a conducting thyratron, the voltage of the plate of that thyratron is substantially lower than the plate voltage of a nonconducting thyratron. Accordingly, a neon lamp is energized whenever the thyratrons between which it is connected are conducting and nonconducting, respectively. The total neon lamp light output at any instant is thus indicative of the number of groups of contiguous devices in like states. The neon lamps 316, 318, 320 . . ., may be physically grouped together as in FIG. 1, and their total light output detected by a photosensitive device, such as a photocell, which in turn may conveniently control any appropriate output utilization circuit.

Figure 4:
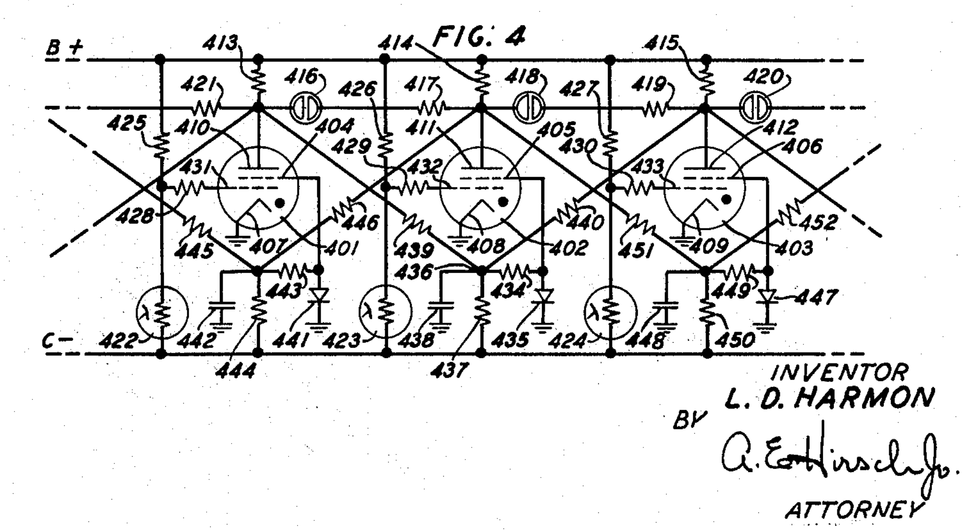
FIG. 4 is a schematic circuit diagram of an embodiment of the present invention that incorporates a circuit for providing lockout.

FIG. 4 depicts an embodiment of the invention that provides lockout, i.e., that automatically inhibits a nonconducting binary device from subsequently being triggered to conduction whenever the electrically adjacent binary devices are conducting. As indicated before, this is desirable whenever the apparatus of the invention is utilized in conjunction with pattern scanning apparatus. There it is desired to preserve such a conduction pattern which constitutes a significant feature typical of geometric figures.

Referring to FIG. 4, the thyratrons 401, 402 and 403; photoresistor triggering control elements 422, 423 and 424; lamps 416, 418 and 420 and the associated bias and load resistors are connected and arranged substantially in the same fashion as depicted in FIG. 3. As in FIG. 3, only three stages have been depicted for the purpose of illustration, since all stages are similarly constructed and any number of stages may be utilized in the same fashion as those of FIG. 1. Unlike the apparatus of FIG. 3, each screen grid 404, 405 and 406 is connected to the plates of the two electrically adjacent thyratrons through a passive network. Consider, for example, thyratron 402. Its screen grid 405 is connected to a point of common connection 436 through a resistor 434 and to ground through a diode element 435. Resistor 437 is connected between point 436 and a source of negative potential C−, and a capacitor 438 is connected between point 436 and ground. Resistor 439 connects the point 436 to the plate 410 of thyratron 401, electrically adjacent to thyratron 402, while a resistor 440 connects the point 436 to the plate 412 of thyratron 403 also electrically adjacent to thyratron 402. The screen grids of thyratrons 401 and 403, and indeed of all other tubes in the line are similarly coupled to the plates of both of the electrically adjacent thyratrons.

The potential of point 436 is determined by the potentials of the source C−, of the plates 410 and 412, and by the relative magnitudes of resistors 434, 437, 439 and 440. Resistor 434 is effectively connected in the circuit, however, only when diode 435 is conducting. Due to the voltage drop across the plate resistor of a conducting thyratron, its plate potential is considerably less positive than the plate potential of a nonconducting thyratron. Accordingly, there are four possible voltage conditions to which the resistor network composed of resistors 434, 437, 439 and 440 may be subjected. The first condition exists when both thyratrons 401 and 403 are nonconducting; the second when thyratron 401 is conducting and thyratron 403 is nonconducting; the third when thyratron 401 is nonconducting and thyratron 403 is conducting; and the fourth when both thyratrons 401 and 403 are conducting. Lockout of thyratron 402 is desired only when both thyratrons 401 and 403 are conducting, i.e., when condition four exists.

When condition one exists, i.e., when both thyratrons 401 and 403 are nonconducting, the potentials of plates 410 and 412 are relatively very positive, and the potential of point 436 is made to be slightly positive by the selection of the relative magnitudes of resistors 434, 437, 439 and 440. As long as point 436 is positive, diode 435 conducts and effectively clamps the screen grid 405 of thyratron 402 to ground potential. With the screen grid 405 at ground level, thyratron 402 may be triggered to conduction in the normal manner upon the application of a triggering impulse to its control grid 432 due to the action of photoresistor 423.

The potential of point 436 assumes another, smaller positive value which is the same for either the second or third conditions referred to above. For condition two, i.e., when thyratron 401 is conducting and thyratron 403 is nonconducting, the potential of plate 410 is at a much less positive value than it assumes when thyratron 401 is nonconducting. This causes a decrease in the positive potential of point 436 from the value it assumes in condition one described above. However, the chosen values of resistors 434, 437, 439 and 440 ensure that this potential is still positive, and, accordingly, screen grid 405 continues to be clamped at ground level by diode 435 thereby permitting normal triggering of thyratron 402.

When condition four exists, i.e., when both thyratrons 401 and 403 are conducting, the potentials of both plates 410 and 412 drop to levels much less positive than those when thyratrons 401 and 403 are nonconducting. Accordingly, the potential of point 436 drops from its previous slightly positive value to a negative value. As soon as point 436 becomes negative in potential, diode 435 no longer conducts. The screen grid 405 then assumes the potential of point 436 and no longer is clamped at ground potential. This negative potential applied to grid 405 prevents thyratron 402 from being triggered to conduction by any subsequent action of photoresistor 423, and thus lockout of thyratron 402 occurs when condition four exists.

Capacitor 438 provides a slight time delay so that as the two thyratrons 401 and 403 which electrically flank the nonconducting thyratron 402 are both triggered to conduction, the point 436 does not assume a negative value immediately. This time delay prevents a lockout in the event that lockout should not really be called for, but thyratrons 401 and 403 are incorrectly fired before thyratron 402. This may occur, for example, when minor electrical variations or physical variations in the photoresistor scanning elements cause timing errors. To illustrate, assume that thyratron 401 is conducting, while thyratrons 402 and 403 are nonconducting. Assume further that thyratron 403 is erroneously triggered to conduction just before thyratron 402 was to have been triggered to conduction. The plate 412 of thyratron 403 will effectively instantaneously swing to a potential much less positive than that when thyratron 403 is nonconducting. The potential of point 436, which was at a slightly positive value, should drop to a negative value. However, capacitor 438, charged to the positive potential of point 436, cannot discharge instantaneously. Accordingly, the potential of point 436 swings toward this negative potential as capacitor 438 discharges toward ground and then is charged negatively. Before point 436 can assume a negative value, thyratron 402 may be triggered to conduction, and thus the false lockout is prevented.

The rate of change of capacitor voltage is determined by the time constant of the network formed by capacitor 438 and all of the associated impedances. However, in computing the time constant, it should be noted that resistor 434 provides a discharge path to ground through diode 435 only for that period of time during which the potential of point 436 is positive. Since the resistance of resistor 434 is selected to be small as compared with the resistance of resistors 437, 439 and 440, resistor 434 constitutes the effective discharge path for capacitor 438 during the time diode 435 conducts. As soon as point 436 assumes a negative potential, diode 435 no longer conducts and effectively constitutes an infinite impedance, at which time the other impedances determine the time constant for the change of capacitor voltage from zero volts to its final negative value. Furthermore, resistor 434 effectively increases the delay time by ensuring that the potential of point 436 swings from a positive potential to ground and then to its final negative value rather than from ground to its final negative value. That is, if resistor 434 is removed from the circuit by shorting it out, diode 435 maintains the potential of point 436 at ground whenever either or both thyratrons 401 and 403 are nonconducting. Thus, when both become triggered to conduction, the potential of point 436 would swing only from ground to its negative value, thus to provide an almost immediate lockout. By including resistor 434, point 436 is allowed to assume a positive value, thereby ensuring a greater time delay by requiring a greater swing of the potential of point 436 before lockout may occur. The time delay associated with the lockout feature, however, should be less than the normally encountered time lag between successive triggering of thyratrons during normal operation of the circuit.

Although this invention has been described with reference to its application in the field of pattern scanning, it is not necessarily limited to this technical area. Furthermore, various modifications of the invention may be suggested to those skilled in the art.

What is claimed is:

1. A counter comprising a plurality of binary devices, each device having an input and an output circuit, means for applying a different signal to each of said input circuits, each of said signals being of sufficient magnitude to trigger independently and selectively the binary device to which it is applied, a plurality of energy radiation sources each connected between the output circuits of a different pair of said binary devices, and means for detecting the total energy radiated by said radiation sources.

2. Apparatus for translating binary information into an analog electric signal comprising a plurality of electron discharge devices each having an input and an output circuit and each capable of being triggered from one state to another upon the application to said input circuit of an input signal, means for coupling a different signal to each of said input circuits, each of said signals being of sufficient magnitude to trigger independently and selectively one of said electron discharge devices, a plurality of light output sources, each connected between said output circuits of a different pair of said electron devices, said sources being energized only when the electron devices of said connected pair are in different states, means for transforming the light output of said light output sources into an analog electric signal.

3. A conduction pattern recognition circuit comprising a plurality of register elements, each of said elements having an input circuit and an output circuit, means for applying signals to said input circuits in order to trigger independently and selectively said register elements from one state of conduction to another, a plurality of energy radiation sources, each of said radiation sources being connected between the output circuits of a different pair of register elements, whereby said radiation sources radiate energy when the register elements of said pair are in different states, means for inhibiting at least one of said register elements from subsequently being triggered whenever said one register element is electrically flanked by elements both of which are in another state of conduction, and means for detecting the radiation of said energy radiation sources.

4. A counter comprising a plurality of electron devices each having an input and an output circuit, a plurality of energy radiation sources each associated respectively with a different pair of electron devices, each of said radiation sources being connected between the output circuits of the pair of electron devices associated therewith, means for applying input signals to said input circuits whereby said electron devices are triggered independently and selectively from one state to another, means for inhibiting the triggering of those of said devices that are flanked by devices in a state different from that of said flanked device, means for delaying the inhibiting of said devices for a selected interval of time after said flanking devices are both triggered to said different state, and means for detecting the energy radiation of said energy radiation sources.

5. A counter as defined in claim 4 wherein each of said energy radiation sources comprises a device of essentially binary operation for converting electrical energy to light energy.

6. A counter as defined in claim 4 wherein each of said electron discharge devices comprises a thyratron having a control grid, a screen grid, and an anode, said control grid being connected in said input circuit, and said anode being connected in said output circuit.

7. A counter as defined in claim 6 wherein said inhibiting means comprises a plurality of resistive networks each of which couples the screen grid of a different one of said thyratrons to the anodes of the two electrically adjacent thyratrons, and a plurality of diodes associated with said resistive networks, each of said diodes connecting a different one of said screen grids to a source of reference potential.

8. A counter as defined in claim 7 wherein said means for delaying the inhibiting of said devices comprises a plurality of capacitors each of which is connected between a point of common connection in a different one of said resistive networks and said source of reference potential.

9. A counter as defined in claim 8 wherein said means for delaying the inhibiting of said devices further includes a plurality of resistors each of which is connected between a different one of said points of common connection in said resistive networks and said diode that is associated therewith.

10. A counter comprising a plurality of electron discharge devices each having a first and a second control circuit and an output circuit, said electron discharge devices being triggered to conduction only upon the application to said first and second control circuits, respectively, of signals bearing a predetermined relationship to each other, means for connecting a source of bias potential to all of said second control circuits, means for applying input signals independently to said first control circuits in order selectively to trigger to conduction said electron discharge devices, a plurality of light output sources each associated with a different pair of said electron discharge devices and each connecting together the output circuits of its associated electron discharge devices, means for applying a selected portion of the output circuit potential of each of said electron discharge devices to the second control circuits of a selected pair of electron discharge devices, and means for detecting the light output of said light output sources.

11. Apparatus for determining group conduction patterns comprising a plurality of gaseous discharge devices, a plurality of light output sources each connected between the output circuits of a different pair of said gaseous discharge devices, each of said gaseous discharge devices having an input circuit and each capable of being triggered from one state of conduction to another upon the application to said input circuit of an input signal, a plurality of photosensitive devices each connected to a different one of said input circuits for generating a signal sufficient to trigger the associated binary device whenever said photosensitive device is subjected to a change in illumination, and a photosensitive detection circuit for detecting the light output of said light output sources.

12. A counter comprising a plurality of gaseous discharge devices each having a control circuit and an output circuit, said gaseous discharge devices each being triggered from one state of conduction to another state upon the application of an input signal to a first portion of said control circuit, means for separately controlling a second portion of said control circuit, means for applying input signals to said first portions of said control circuits in order trigger independently and selectively said gaseous discharge devices, a plurality of light output sources each associated with a different pair of discharge devices and each connected between the output circuits of the associated gaseous discharge devices, means for applying a selected portion of the output circuit potential of each of said gaseous discharge devices to the said second portions of the said control circuits of the electrically adjacent gaseous discharge devices, and means comprising a photosensitive detection circuit for detecting and transforming the light output of said light output sources into an analog electric signal.

References Cited in the file of this patent

UNITED STATES PATENTS

| | | |
|---|---|---|
| 1,985,683 | Nicolson | Dec. 25, 1934 |
| 2,398,771 | Compton | Apr. 23, 1946 |
| 2,432,084 | Blair | Dec. 9, 1947 |
| 2,756,934 | Ziffer | July 31, 1956 |
| 2,948,890 | Barth | Aug. 9, 1960 |